(12) United States Patent
Duine et al.

(10) Patent No.: US 6,310,725 B1
(45) Date of Patent: Oct. 30, 2001

(54) OPTICAL SWITCHING DEVICE

(75) Inventors: Peter Alexander Duine; Paul Van Der Sluis, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/710,831

(22) Filed: Nov. 13, 2000

Related U.S. Application Data

(63) Continuation of application No. 09/397,743, filed on Sep. 16, 1999, now abandoned.

(30) Foreign Application Priority Data

Sep. 17, 1998 (EP) .................................................. 98203105

(51) Int. Cl.$^7$ ................................ G02B 6/26; G02B 1/10
(52) U.S. Cl. ................................ 359/585; 385/18; 385/16
(58) Field of Search ..................... 385/16, 18; 359/577, 359/584, 585

(56) References Cited

U.S. PATENT DOCUMENTS 5,905,590 * 5/1999 Van Der Sluis et al. ............ 359/275

* cited by examiner

Primary Examiner—James Phan
(74) Attorney, Agent, or Firm—Aaron Waxler

(57) ABSTRACT

A description is given of a switching device (1) comprising a transparent substrate (3) and a switching film (5) which incldes a hydride of a trivalent metal, such as gadolinium, and which is covered with a palladium layer (7). Between the substrate (3) and the switching film (5) a thin magnesium layer (4) is interposed. By exchange of hydrogen, the switching film can be reversibly switched from a transparent state to a highly reflective state. The conversion between both states is reversible, and this phenomenon can be used, for example, in a luminaire or for climate control.

7 Claims, 2 Drawing Sheets

OPTICAL SWITCHING DEVICE

CROSS REFERENCE TO RELATED APPLICATIONS

This is a continuation of application Ser. No. 09/397,743 filed Sep. 16, 1999, now abandoned.

BACKGROUND OF THE INVENTION

The invention relates to an optical switching device comprising a substrate and a switching film which comprises a hydride of a trivalent metal, which hydride can be reversibly switched between a low-hydrogen, mirror-like composition and a high-hydrogen transparent composition by an exchange of hydrogen. The invention additionally relates to the use of such a switching device.

In international patent application WO 98/10329 (PHN 15969) filed by Applicants, a switching device is disclosed in which a film of a hydride of a trivalent metal, such as gadolinium hydride $GdH_x$, can be reversibly switched between a low-hydrogen ($x<\approx2$) composition and a high-hydrogen ($x>\approx2$) composition by an exchange of hydrogen. Both compositions have different optical properties. At a low hydrogen content ($x<\approx2$), the film has a metallic mirror-like or reflective character and is non-transparent. At a high hydrogen content ($x>\approx2$), the film is semiconductive, transparent and yellow in transmission. When the switching film in the low-hydrogen state is exposed to hydrogen, the mirror-like state is converted to the hydrogen-rich transparent state. The transparent film can be converted back to the mirror-like state by heating and/or evacuation of hydrogen. The switching operation can be carried out at room temperature. Said patent application also discloses the use of a hydride of an alloy of the trivalent metal and magnesium. The presence of magnesium in the alloy increases the transmission of the switching film in the transparent state and decreases; the transmission in the non-transparent state, resulting in an improvement of the contrast, which is the ratio between the transmission in of the transparent and the non-transparent state of the switching film. The addition of magnesium makes the switching film colourless in the transparent state. Moreover, the switching speed from the mirror-like state to the transparent state is increased.

The reflectivity of a $GdH_x$ switching film in the mirror-like (low-hydrogen) state is about 15 to 20% in the visible wavelength range. The reflectivity of a $(Gd_{0.3}Mg_{0.7})H_x$ switching film is about 50 to 70% in the same state. For some applications it is desirable that the reflectivity is increased to a level which, preferably, is comparable to that of a metal reflector like aluminium, which has a reflectivity >90%.

SUMMARY OF THE INVENTION

It is an object of the present invention to increase the reflectivity of an optical switching device in the low-hydrogen state, without adversely affecting the transmission in the high-hydrogen state.

This object is achieved in an optical switching device as specified in the opening paragraph, which is characterized in that a thin magnesium layer is arranged between the substrate and the switching film. Surprisingly, it has been found that the insertion of a thin magnesium layer between the substrate and the switching film remarkably increases the reflectivity of the switching device when the switching film is in the reflective state, without diminishing the transmission of the device in the transparent state. For example in a switching device having a gadolinium hydride film in the low-hydrogen state (composition about $GdH_2$), the reflectivity is increased from about 15% to about 70%. When the gadolinium hydride film is in the high-hydrogen state (composition about $GdH_3$), the transmission of the device is practically not changed by the magnesium film.

A thin magnesium layer is to be taken to means a layer having a thickness which is about 0.001 to 0.1 of the thickness of the switching film. In a preferential embodiment, the thickness of the magnesium layer is between 0.1 and 25 nm. Below 0.1 nm the effect is less remarkable, whereas above 25 nm the effect is not further improved. Moreover, greater thicknesses of the magnesium film will cause the transmission of the switching device in the transparent state to be be reduced.

Apart from Gd, other trivalent transition and rare earth metals, and alloys of these metals, exhibit similar phenomena. Amongst these metals are e.g. erbium (Er), samarium (Sm), lutetium (Lu), yttrium (Y) and lanthanum (La).

Instead of the above described alloy of the trivalent metal and magnesium, a multilayer stack of very thin (1–2 nm) alternating layers of a trivalent metal and Mg may be used, e.g. a multilayer stack of 50 Mg|Gd pairs. Such a multilayer has the additional advantage that it leads to an increase of the switching speed between the optical states.

Switching of the switching film takes place with an exchange of hydrogen. The transmission of the switching film is governed by the hydrogen content: the transmission increases as the hydrogen content increases. If molecular hydrogen gas is supplied to the switching film, the transmission increases as the hydrogen pressure increases. The hydrogen must be dissociated to atomic H. The rate of dissociation can be increased by providing the surface of the switching film with a thin layer of palladium having a thickness, for example, of 5 nm. At said thickness, the palladium layer is discontinuous. The layer thickness is not critical and is chosen to be in the range between 2 and 25 nm. Thin layers of 2 to 10 nm are preferred, however, because the thickness of the palladium layer determines the maximum transmission of the switching device. In addition, the palladium layer protects the underlying switching film against oxidation.

Apart from palladium, other catalytically active metals which promote hydrogen dissociation, such as platinum, nickel and cobalt, or alloys with these metals, or a niobium-palladium bilayer, can be provided on the switching film.

The molecular hydrogen can be passed in a simple manner from a hydrogen gas cylinder to the switching film at room temperature. A low-hydrogen, mirror-like switching film then changes to a transparent hydrogen-rich state. This conversion is reversible: the transparent film is converted to a mirror-like state by heating and/or evacuation of hydrogen. Said reversible conversion can take place at a temperature close to room temperature, or at higher temperatures. Switching can also be carried out by heating or cooling the switching film in a hydrogen atmosphere.

Atomic hydrogen can also be obtained in other ways, such as by electrolytic reduction of water at the switching film in accordance with the following reaction:

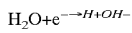

Atomic hydrogen can additionally be generated from a hydrogen plasma. In this case, a catalytically active layer, for example, of palladium is not necessary. Atomic hydrogen can also originate from another metal hydride, such as metal alloys for hydrogen storage, which are known per se.

The switching film in accordance with the invention is thin, i.e. its film thickness is less than 2 μm. The film thickness of the switching film preferably ranges between 100 and 1,000 nm. As hydrogen must diffuse in the switching film, the film thickness determines the rate of full conversion from the mirror-like to the transparent state, and conversely.

Substrates onto which the layers of the switching device may be provided are transparent materials, such as glass, quartz, diamond, aluminium oxide or foil of a (flexible) synthetic resin. The substrate may be flat or curved.

The substrate may be provided with a thin layer of a transparent electroconductive oxide, such as ITO or ATO. Such an oxide layer serves as a transparent electrode in electrochromic devices, such as described in the international patent application WO 98/08139. The use of a thin Mg layer between the electroconductive oxide layer and the switching film according to the invention has the additional advantage of an improved adhesion between the switching film and the electroconductive oxide layer. From a viewpoint of adhesion the thickness of the magnesium layer is preferably between 0.1 and 10 nm.

A preferential embodiment of the device according to the invention is characterized in that the switching film comprises a hydride of an alloy of the trivalent metal and 5 to 95 at. % magnesium for the above-mentioned reasons.

The switching film is applied as a thin layer onto the magnesium layer by means of conventional methods such as vacuum evaporation, sputtering, laser ablation, chemical vapour deposition or electroplating. In this respect, it is important that during and after application of the switching layer, the metal of the switching film is not subject to oxidation. In a vacuum-evaporation process, this is achieved by maintaining the pressure, in is particular, of the residual gases water and oxygen, at a low level below $10^{-6}$ to $10^{-7}$ mbar. By subjecting the trivalent metal to hydrogen at a pressure of $10^{-2}$ mbar, the metals in the switching film can be converted to the hydride state with a low hydrogen content, which film has a mirror-like appearance and is non-transparent. By increasing the hydrogen pressure further, the switching film becomes transparent.

The catalytically active layer, for example, of Pd, and the magnesium layer, can also be applied by means of one of the above-mentioned methods.

Since the switching device in accordance with the invention can be switched from a reflective, non-transparent state to a transparent state, and conversely, it can be used in many applications. By virtue of this optical effect, the switching device can be used as a variable beam splitter, optical shutter, and for controlling the illuminance or the shape of light beams in luminaires, such as car head lights. Dependent upon the film thickness of the switching film, this film can exhibit almost zero transmission in the reflective state. This enables a switching device having a great contrast to be manufactured. The switching device can also be used in applications in which electrochromic layers are presently being used, such as architectural glass, vision control glass, sunroofs-and rear-view mirrors. In the reflective state not only visible light is reflected, but also radiant heat or infrared light, so that such a switching device can also be used for climate control. Such windows can regulate the solar energy input, thereby reducing the energy consumption by airco systems.

By making a pattern in the switching film, a thin display can be manufactured. The construction of such a display is much simpler than that of an LCD (liquid crystal display) due to the absence of an LC layer, orientation layer, retardation layer and polarization filter.

A pattern in the switching film can also be used if zero transmission in the reflective state is unacceptable for reasons of safety. By e.g. photolithographically patterning the switching film, a fine pattern can be obtained which leaves a certain part of the substrate uncovered by the switching film. Thus, accidental hydrogen leakage of the system will not lead to zero transmission of the device.

BRIEF DESCRIPTION OF THE DRAWING

These and other aspects of the invention will be apparent from and elucidated with reference to the embodiments described hereinafter and the accompanying drawings, in which.

DESCRIPTION IF THE PREFERRED EMBODIMENTS

Exemplary Embodiment 1

Figure 1:
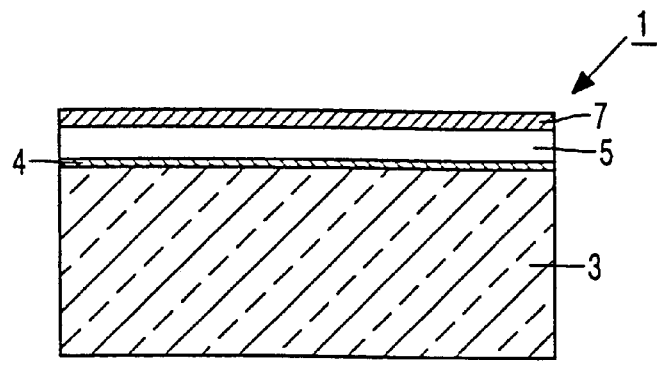
FIG. 1 is a schematic cross-sectional view of an optical switching device in accordance with the invention.

FIG. 1 is a schematic, cross-sectional view of a switching, device 1 in accordance with the invention. The layer thicknesses are not drawn to scale. A polished, quartz substrate 3 is provided with a 10 nm thick magnesium layer 4. Onto the magnesium layer 4, a 200 nm thick of Gd film serving as a switching film 5 is applied. Both layers 4 and 5 are provided by means of electron-beam evaporation. The residual pressure in the evaporation apparatus is less than $10^{-7}$ mbar. The deposition rate is 1.0 nm/s. In the same apparatus, a 10 nm thick palladium layer 7 is evaporated onto the switching film 5 by means of resistance heating at a deposition rate of 0.2 nm/s. Said switching film 5 has a metallic appearance and is non-transparent.

The non-transparent sample device 1 is arranged in a pressure cell provided with two windows of quartz glass. Said pressure cell also comprises connections for the supply of hydrogen and for connecting it to a vacuum pump. The pressure cell is arranged in the sample room of a spectrophotometer. After evacuation, the pressure cell is filled at room temperature with molecular hydrogen up to a pressure of 5 bar ($5 \times 10^5$ Pa). The palladium layer 7 forms atomic H which is subsequently absorbed in the switching film 5. Within a few seconds the sample becomes transparent having a transmission of 15% at 600 nm. The layer thus formed comprises a hydride of Gd with a high hydrogen content: GdH, (x>≈2, composition about $GdH_3$).

Subsequently, the pressure cell is evacuated to a pressure of $10^{-2}$ mbar (1 Pa). Within a few seconds, the transmission decreases from 15% to approximately 0.1%. In this state, the switching film is reflective, and comprises a hydride of Gd with a low hydrogen content: $GdH_x$ ($x<\approx2$, composition about $GdH_2$).

The reflective switching film 5 having a very low transmission is converted to a transparent film having a transmission of 15% by renewed exposure to hydrogen. The conversion between both compositions is reversible; an optical switching film is obtained by the supply or discharge of hydrogen.

Figure 2:
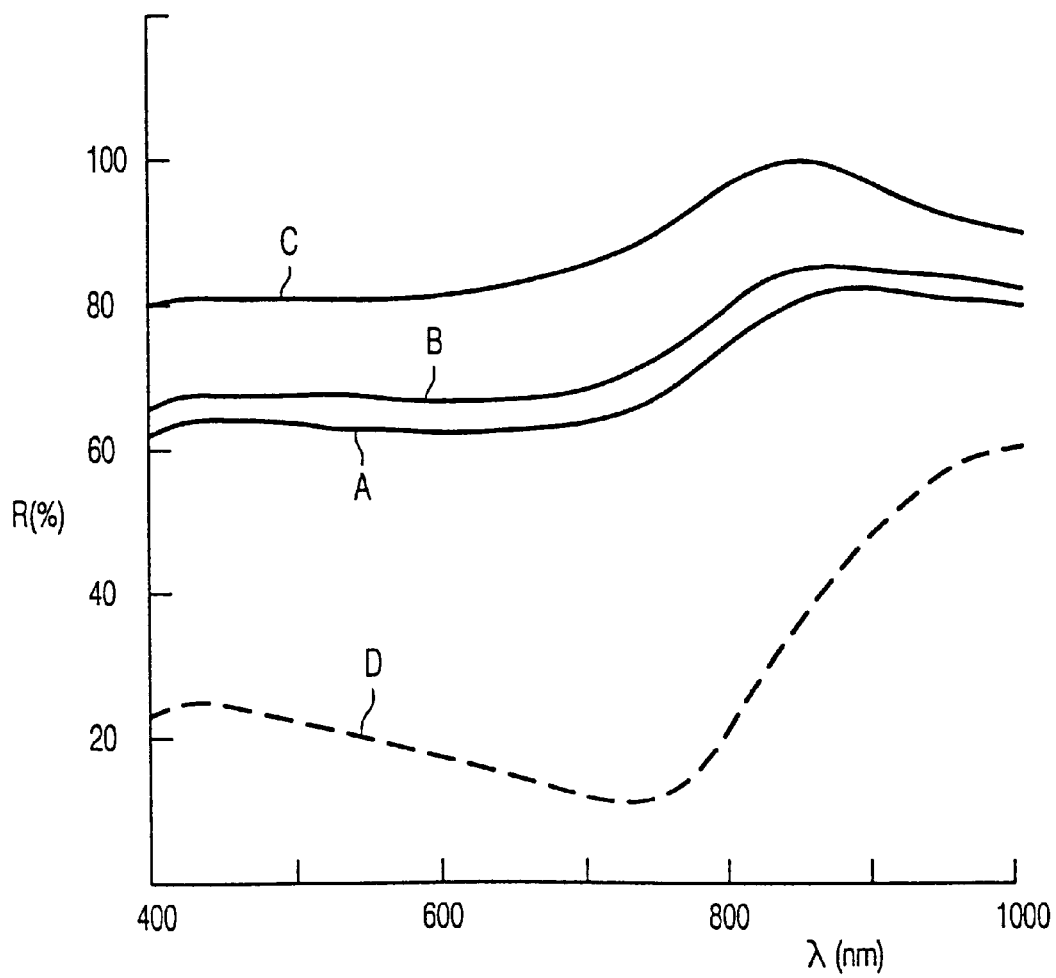
FIG. 2 shows the reflectivity R (in % with respect to aluminium) as a function of the wavelength S(in nm) of switching devices having a switching film of a hydride of gadolinium and a magnesium layer with various thicknesses when the switching film is in the reflective state.

FIG. 2 shows the reflectivity R in % relative to aluminium of this and other devices at wavelengths S between 400 and 1000 nm when the devices are in the low-hydrogen reflective state. Curve A shows the reflectivity of the device having a magnesium layer 4 with a thickness of 10 nm.

In the same Figure, curve B shows the reflectivity R of a similar device having a magnesium layer 4 with a thickness of 15 nm. Curve C shows the reflectivity of a similar device having a magnesium layer 4 with a thickness of 20 nm.

For comparison (not according to the invention), the dashed curve D shows the reflectivity R of a similar device in which the magnesium layer 4 is absent. The Figure shows, that the addition of a magnesium layer 4 increases the reflectivity R from about 15% to about 60% to 80%.

Figure 3:
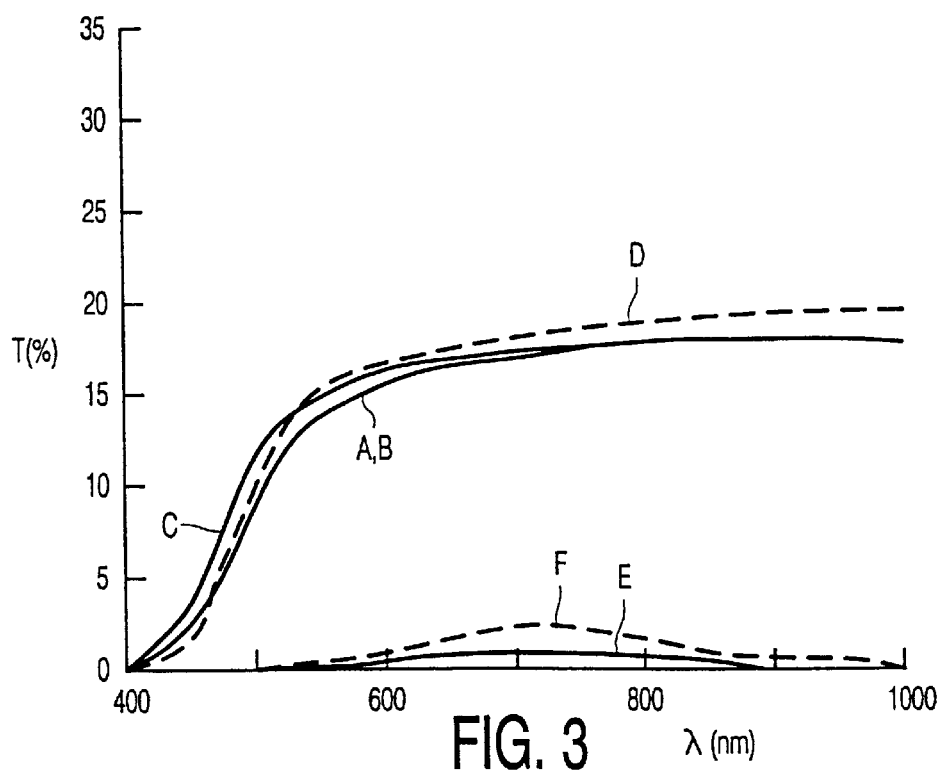
FIG. 3 shows the transmission T (in %) as a function of the wavelength S (in nm) of switching devices having a switching film of a hydride of gadolinium and a magnesium. layer with various thicknesses when the switching film is in the reflective state, and when the switching film is in the transparent state.

In FIG. 3, the transmission T (in %) is shown at wavelengths S between 400 and 1000 nm when the above devices are in the high-hydrogen transparent state. The devices exhibiting curves A,B,C and D correspond to those of FIG. 2. Curves A and B, which coincide, show the transmissions of devices having a magnesium layer 4 of 10 and 15 nm respectively. Curve C shows the transmission of a device having a magnesium layer 4 of 20 nm. For comparison (not according to the invention), the dashed curve D shows the transmission of a similar device in which the magnesium layer 4 is absent. This FIG. shows that the addition of a magnesium layer 4 does not adversely affect the transmission of the device. However, as shown in FIG. 2, the reflectivity R of the device is remarkably enhanced by the magnesium layer 4.

FIG. 3 also shows the transmission T of the devices when they are in the low-hydrogen reflective state. Curve E shows the transmission of a device having a 10–20 nm thick magnesium layer 4. The dashed curve F shows the transmission of the device when the magnesium layer 4 is absent. The presence of the magnesium layer 4 causes an increase of the contrast of the device, i.e. the ratio between the transmissions in the high-hydrogen transparent state and the low-hydrogen reflective state.

Exemplary Embodiment 2

Figure 4:
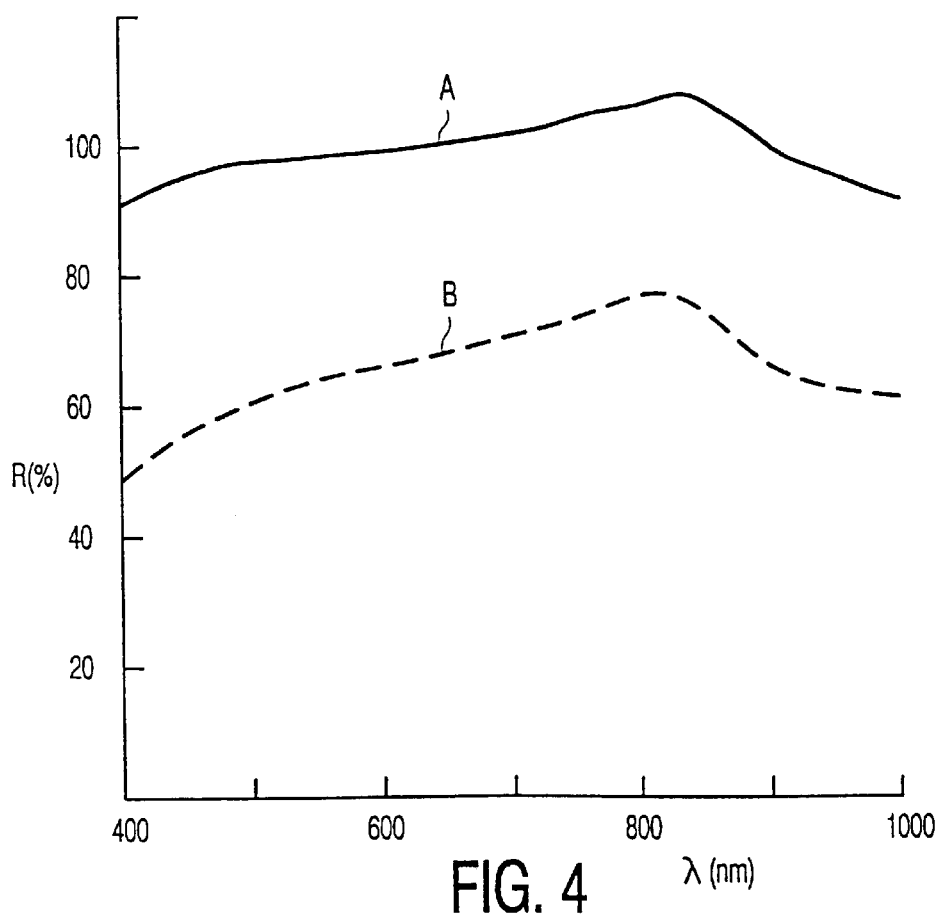
FIG. 4 shows the reflectivity R (in % with respect to aluminium), with (curve A) and without (curve B) a magnesium layer as a function of the wavelength S (in nm) of a switching device having a switching film of a hydride of $Gd_{0.3}Mg_{0.7}$ and a magnesium layer with various thicknesses when the switching film is in the reflective state.

Embodiment 1 is repeated with a switching film 5 containing 30 at. % Gd and 70 at. % Mg, and a magnesium layer 4 with a thickness of 10 nm. Curve A in FIG. 4 shows the reflectivity R in % relative to aluminium as a function of the wavelength S (in nm), when the device is in the high-hydrogen reflective state. Curve A shows that the device is comparable, and in a certain wavelength region even superior, to an aluminium reflective mirror. For comparison (not according to the invention), the dashed curve B shows the reflectivity of a similar device in which the magnesium layer 4 is absent. The enhancement of the reflectivity R by the presence of the magnesium layer 4 is very distinct.

The optical switching device in accordance with the invention, which comprises a switching film of a hydride of a trivalent metal and a thin magnesium layer between the substrate and the switching film, can be reversibly converted from a highly reflective, non-transparent state to a transparent state by exchange of hydrogen The reflectivity can be made comparable to that of an aluminium reflector. Such a switching device can be used, inter alia, as an optical switching element, in rear-view mirrors, sunroofs, architectural glass, vision control glass, luminaires and displays.

What is claimed is:

1. An optical switching device comprising a substrate and a switching film which comprises a hydride of a trivalent metal, which hydride can be reversibly switched between a low-hydrogen, mirror-like composition and a high-hydrogen transparent composition by an exchange of hydrogen, characterized in that a thin magnesium layer is arranged between the substrate and the switching film.

2. A device as claimed in claim 1, characterized in that the thickness of the magnesium layer is between 0.1 and 25 nm, preferably between 0.1 and 10 nm.

3. A device as claimed in claim 1, characterized in that the trivalent metal is selected from the group consisting of gadolinium, erbium, samarium, lutetium, yttrium and lanthanum.

4. A device as claimed in claim 1, characterized in that the switching film is provided with a catalytically active layer comprising at least one metal selected from the group consisting of palladium, platinum, cobalt and nickel.

5. A device as claimed in claim 1, characterized in that the switching film has a thickness in the range from 20 to 1,000 nm.

6. A device as claimed in claim 1, characterized in that the switching film comprises a hydride of an alloy of the trivalent metal and 5 to 95 at. % magnesium.

7. A use of a switching device as claimed in claim 1 as a display or a mirror with variable transmission, or in a luminaire, vision control glass, architectural glass or sunroof.

* * * * *